United States Patent
Hsu et al.

(10) Patent No.: US 7,113,006 B2
(45) Date of Patent: Sep. 26, 2006

(54) CAPACITOR RELIABILITY FOR MULTIPLE-VOLTAGE POWER SUPPLY SYSTEMS

(75) Inventors: Louis L. Hsu, Fishkill, NY (US); Rajiv V. Joshi, Yorktown Heights, NY (US); Jack Allan Mandelman, Flat Rock, NC (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 11/065,840

(22) Filed: Feb. 25, 2005

(65) Prior Publication Data

US 2006/0192612 A1   Aug. 31, 2006

(51) Int. Cl.
  *H03K 5/22*   (2006.01)
  *H03K 5/153*  (2006.01)
  *H01G 23/00*  (2006.01)
(52) U.S. Cl. ........................... 327/77; 361/233
(58) Field of Classification Search ............... 327/50, 327/77, 365, 427; 363/60, 59; 361/233, 361/139
See application file for complete search history.

(56) References Cited

U.S. PATENT DOCUMENTS

| | | | |
|---|---|---|---|
| 5,461,297 A | 10/1995 | Crawford | |
| 5,581,454 A * | 12/1996 | Collins | 363/59 |
| 5,880,921 A * | 3/1999 | Tham et al. | 361/233 |
| 6,143,997 A | 11/2000 | Feng et al. | |
| 6,538,907 B1 * | 3/2003 | Hoshino et al. | 363/60 |
| 6,559,000 B1 | 5/2003 | Kim et al. | |
| 6,563,235 B1 * | 5/2003 | McIntyre et al. | 307/109 |

* cited by examiner

*Primary Examiner*—Dinh T. Le
(74) *Attorney, Agent, or Firm*—Anne V. Dougherty; Ryan, Mason & Lewis, LLP

(57) ABSTRACT

A capacitor circuit having improved reliability includes at least first and second capacitors, a first terminal of the first capacitor connecting to a first source providing a first voltage, a first terminal of the second capacitor connecting to a second source providing a second voltage, the first voltage being greater than the second voltage. The capacitor further includes a voltage comparator having a first input for receiving a voltage representative of the first voltage, a second input for receiving a third voltage provided by a third source, and an output for generating a control signal. The control signal is a function of a difference between the voltage representative of the first voltage and the third voltage. A switch is connected to second terminals of the first and second capacitors. The switch is selectively operable in one of at least a first mode and a second mode in response to the control signal, wherein in the first mode the switch is operative to connect the first and second capacitors together in parallel, and in the second mode the switch is operative to connect the first and second capacitors together in series. The first mode is indicative of the voltage representative of the first voltage being less than or about equal to the third voltage, and the second mode is indicative of the voltage representative of the first voltage being greater than the third voltage.

21 Claims, 4 Drawing Sheets

CAPACITOR RELIABILITY FOR MULTIPLE-VOLTAGE POWER SUPPLY SYSTEMS

FIELD OF THE INVENTION

This invention relates to capacitor circuits, and more specifically to capacitor circuits that are operative across a range of power supply voltages.

BACKGROUND OF THE INVENTION

Capacitors are widely used in semiconductor technology. They may be used, for example, for noise decoupling, for blocking direct current, and for charge storage in radio-frequency (RF) and analog applications. Semiconductor capacitors typically take the form of diffusion capacitors, trench capacitors, gate capacitors, and metal-insulator-metal (MIM) capacitors. Typically, these devices depend on an insulating layer, frequently silicon dioxide, to form the dielectric between the terminals of the capacitor. Like other layers in a semiconductor device, these dielectric layers are continuously scaled in order to make devices smaller, to increase performance, and to reduce cost of production. As dielectric layers are scaled, especially when scaled faster than the voltage or power supply level, premature punch-through, breakdown, and other dielectric damage is frequently encountered. As a result, obtaining highly-reliable, high-value capacitors becomes increasingly more challenging.

Adding to this challenge is the fact that integrated circuits must frequently be designed to work within a wide range of operating voltages. For example, an integrated circuit may need to work within a power supply voltage range from 1.2 volts to 3.6 volts. This is especially true when a designer wishes that a device be compatible with both modern and older semiconductor technologies.

One way to resolve the problem of voltage-induced dielectric damage in semiconductor capacitors is to simply connect two or more capacitors in series. With this configuration, the voltage drop across any one of the capacitors is reduced and, correspondingly, the reliability of that capacitor is maintained. Nevertheless, maximum total capacitance for a given array of capacitors is achieved by wiring the capacitors in parallel. As a result, it is most advantageous to wire an array of capacitors in parallel when the power supply voltage is low enough that capacitor reliability is not adversely affected. This allows the circuit to have the maximum total capacitance for a given area. Conversely, when the power supply voltage is high enough to adversely affect capacitor reliability, it is usually advantageous to wire the array of capacitors in series to such an extent that reliability is maintained at the cost of reduced total capacitance. Accordingly, in those integrated circuits that are used over a wide range of power supply voltages, it is desirable to be able to selectively and dynamically modify the wiring configuration of capacitors depending upon the level of power supply voltage.

SUMMARY OF THE INVENTION

The present invention addresses the above-identified need by providing, in an illustrative embodiment, a novel capacitor circuit that allows its constituent capacitors to be dynamically configured as a function of a level of the voltage across the capacitors. When a supply voltage to the capacitor circuit is greater than a specified level, the circuit selectively connects the capacitors together in series, so as to distribute the supply voltage across the capacitors in such a manner as to improve reliability of the capacitors. When the supply voltage is less than the specified level, the circuit connects the capacitors together in parallel, so as to increase an overall capacitance of the circuit for a given area.

In accordance with one embodiment of the invention, a capacitor circuit having improved reliability includes at least first and second capacitors, a first terminal of the first capacitor connecting to a first source providing a first voltage, a first terminal of the second capacitor connecting to a second source providing a second voltage, the first voltage being greater than the second voltage. The capacitor further includes a voltage comparator having a first input for receiving a voltage representative of the first voltage, a second input for receiving a third voltage provided by a third source, and an output for generating a control signal. The control signal is a function of a difference between the voltage representative of the first voltage and the third voltage. A switch is connected to second terminals of the first and second capacitors. The switch is selectively operable in one of at least a first mode and a second mode in response to the control signal, wherein in the first mode the switch is operative to connect the first and second capacitors together in parallel, and in the second mode the switch is operative to connect the first and second capacitors together in series. The first mode is indicative of the voltage representative of the first voltage being less than or about equal to the third voltage, and the second mode is indicative of the voltage representative of the first voltage being greater than the third voltage.

In an illustrative embodiment, a capacitor circuit comprises two capacitors, a voltage comparator, and a switch. Three voltage levels are provided: a power supply voltage, Vcc, a ground level, Vss, and a reference source voltage, Vref. Vref is placed at a voltage approximately equal to the maximum sustainable voltage at which the capacitors can achieve a desired reliability lifetime. The voltage comparator is operative to cause the switch to connect the two capacitors in parallel when Vcc is less than Vref so that the full power supply voltage, Vcc, is dropped across each capacitor. Total circuit capacitance is thereby maximized. When Vcc exceeds Vref, the switch connects the two capacitors together in series such that Vcc is distributed across the combination of capacitors. In this way, the reliability of the capacitors in the circuit is maintained even when the power supply voltage exceeds the maximum voltage for sustained capacitor reliability.

DETAILED DESCRIPTION OF THE INVENTION

The present invention will be illustrated below in conjunction with illustrative embodiments of capacitor circuits. It should be understood, however, that the invention is not limited to the particular circuitry arrangements of the illustrative embodiments. Moreover, in the illustrative embodiments, the capacitor circuit will be illustrated as a component of an integrated circuit. Nevertheless, the scope of this invention is intended to include a capacitor circuit formed of discrete device components mounted on, for example, a printed circuit board, substrate, etc. These and other possible modifications to the illustrative embodiments within the scope of this invention will be apparent to those skilled in the art.

Figure 1:
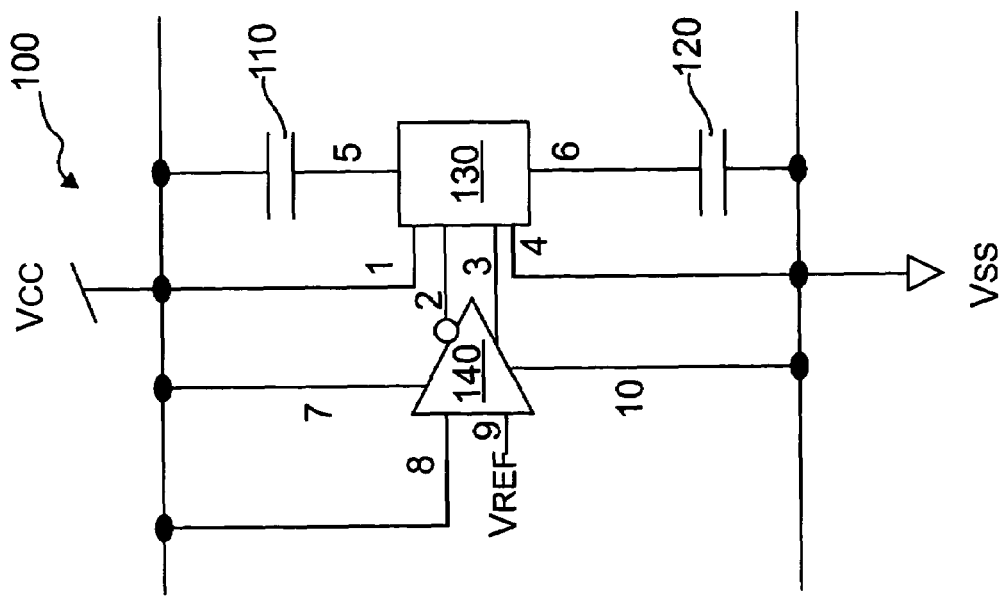
FIG. 1 is a schematic diagram illustrating an exemplary capacitor circuit, formed in accordance with one embodiment of the invention.

FIG. 1 is a schematic diagram depicting an exemplary capacitor circuit 100, formed in accordance with one embodiment of the present invention. The circuit 100 comprises two capacitors 110, 120, a switch 130, and a voltage comparator 140, or alternative voltage detection circuitry. Three voltage levels are provided to the circuit 100: a power supply voltage, Vcc; a ground level, Vss; and a reference source voltage, Vref. It is to be understood that in an alternative embodiment of the invention, more than one power supply voltage level may be detected, and thus additional reference source voltages may be provided to the circuit 100. A first terminal of capacitor 110 is connected to the power supply voltage Vcc, and a second terminal of capacitor 110 is connected to switch 130 at node 5. A first terminal of capacitor 120 is connected to switch 130 at node 6, and a second terminal of capacitor 120 is connected to ground level Vss. Switch 130 connects to Vcc at node 1 and connects to Vss at node 4. At least a given one of capacitors 110 and 120 preferably comprises an MOS gate oxide capacitor, a trench capacitor, a diffusion capacitor, a metal-insulator-metal (MIM) capacitor and/or a discrete capacitor, although the present invention is not limited to only these particular types of capacitors.

Vcc, or a voltage representative thereof, is connected to a first input of the voltage comparator 140 at node 8. Vref is connected to a second input of the voltage comparator 140 at node 9. Power is supplied to the voltage comparator 140 by connecting the comparator to Vcc at node 7 and to Vss at node 10. In order to reduce glitches which may be generated by the voltage comparator 140, particularly when Vcc is substantially close to Vref, hysteresis can be employed. Various methodologies for implementing hysteresis in a comparator are well known by those skilled in the art.

Voltage comparators are frequently found in electronic circuits and will be familiar to those skilled in the art. Moreover, voltage comparators are described in various publications including, for example, P. Horowitz and W. Hill, *The Art of Electronics*, Newnes Publishing 1991, which is incorporated by reference herein. Generally, the output(s) of a voltage comparator is(are) switched to a logical high or low state depending on the relative magnitudes of the voltages at the inputs thereof. In the embodiment shown in FIG. 1, the voltage comparator 140 compares the voltages on nodes 8 and 9 and generates an output which is a function of a difference between the two voltages. If the voltage on node 8 (Vcc) is higher than the voltage on node 9 (Vref), then the voltage comparator outputs at nodes 2 and 3 go high and low, respectively. If, on the other hand, the voltage on node 8 (Vcc) is lower than that on node 9 (Vref), the voltage comparator outputs at nodes 2 and 3 go low and high, respectively. As shown in FIG. 1, comparator 140 includes two outputs which generate corresponding output signals that are logical complements of one another. This is often referred to as a differential output comparator. It is to be appreciated, however, that a comparator having a differential output is not a requirement of the invention.

Figure 2A:
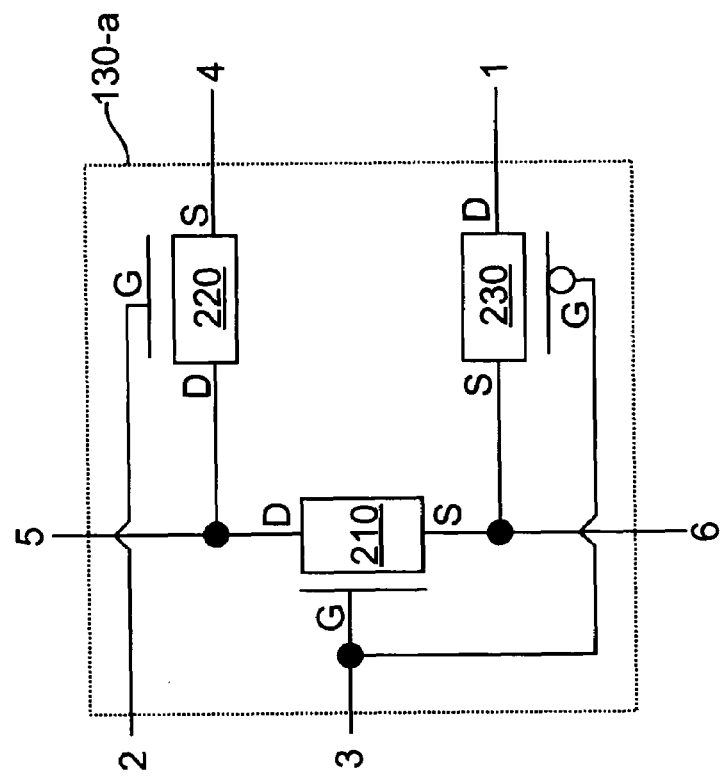
FIG. 2A is a schematic diagram illustrating an exemplary switch comprising metal-oxide-semiconductor (MOS) devices suitable for use in the capacitor circuit of FIG. 1, in accordance with one embodiment of the invention.
Figure 2C:
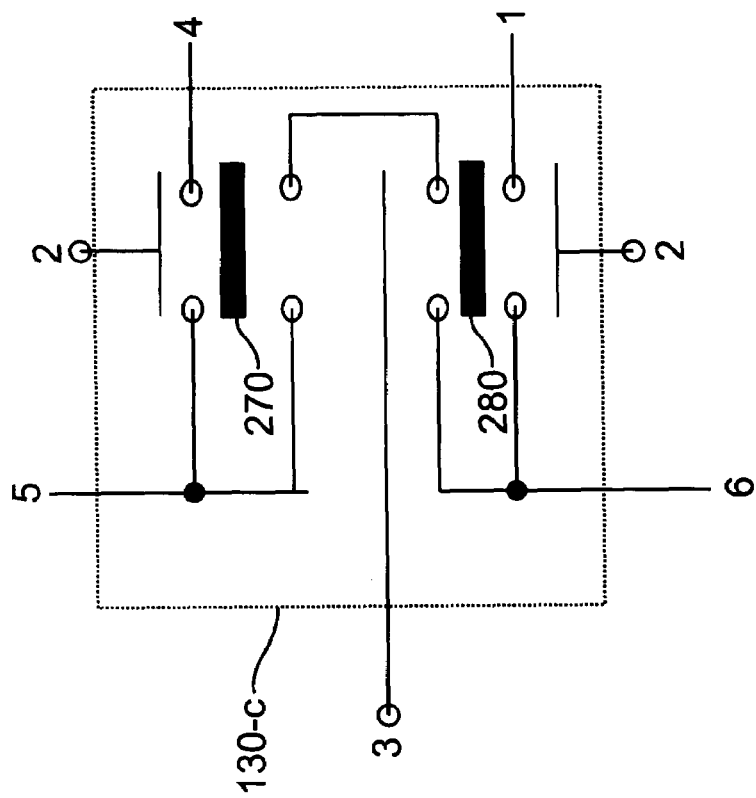
FIG. 2C is a schematic diagram illustrating an exemplary switch comprising hinge-type MEMS devices suitable for use in the capacitor circuit of FIG. 1, in accordance with a third embodiment of the invention.
Figure 2B:
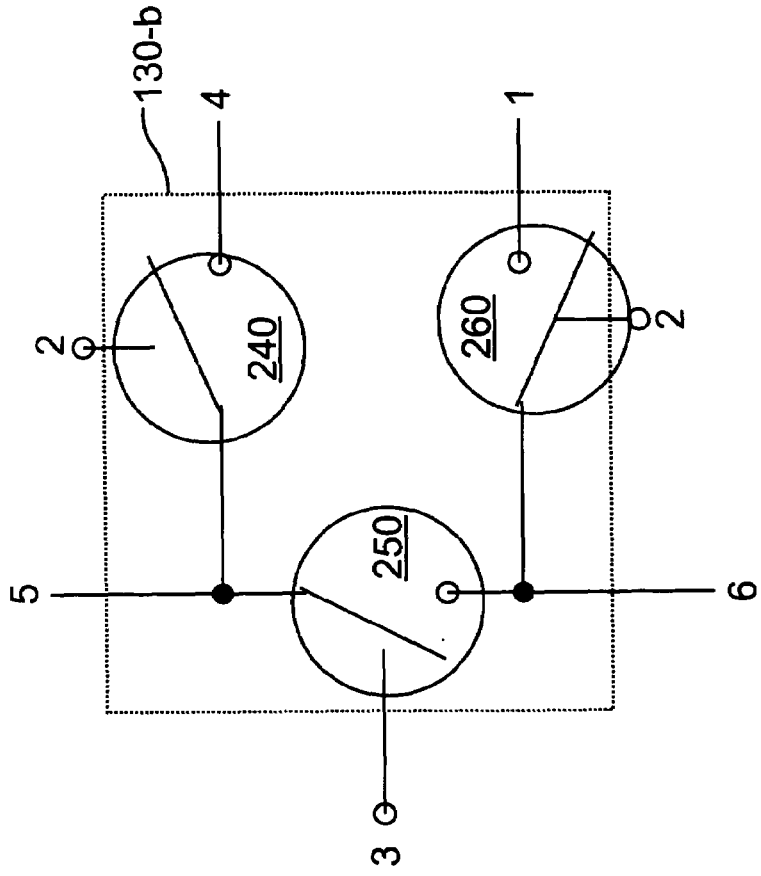
FIG. 2B is a schematic diagram illustrating an exemplary switch comprising cantilever-type microelectromechanical system (MEMS) devices suitable for use in the capacitor circuit of FIG. 1, in accordance with a second embodiment of the invention.

In accordance with an aspect of the invention, the outputs of the voltage comparator 140 at nodes 2 and 3 are operative to cause switch 130 to electrically connect capacitors 110 and 120 together in parallel when Vcc is less than Vref, and to cause the switch 130 to connect the capacitors 110, 120 together in series when Vcc is greater than Vref. Numerous circuit configurations of switch 130 can be used to implement this function. By way of example, and without loss of generality, FIGS. 2A through 2C show three illustrative embodiments for implementing switch 130, in accordance with the invention. It is noted that the reference designations depicted in FIGS. 2A–2C correspond directly to the reference designations shown in FIG. 1.

The illustrative switch embodiment depicted in FIG. 2A comprises MOS transistor devices. More specifically, switch 130-*a* comprises two n-channel MOS (NMOS) transistor devices 210, 220, and one p-channel MOS (PMOS) transistor device 230. The NMOS transistor device 210 has a gate (G) connected to node 3, a source (S) connected to node 6, and a drain (D) connected to node 5. The second NMOS transistor device 220 has a gate connected to node 2, a source connected to node 4, and a drain connected to node 5. The PMOS transistor device 230 is configured such that its gate is connected to node 3, its source is connected to node 6, and its drain is connected to node 1.

The functioning of switch 130-*a* in FIG. 2A involves the operation of typical NMOS and PMOS transistor devices and will, as a result, be easily comprehended by one skilled in the art. As described above, when Vcc is greater than Vref, the outputs of the voltage comparator 140 at nodes 2 and 3 will be high and low, respectively. A high voltage on node 2 causes NMOS transistor device 220 to turn on such that a substantially low-resistance (e.g., less than about ten ohms) electrical path is created between nodes 4 and 5. This is operative to electrically connect the second terminal of capacitor 110 in FIG. 1 to Vss. At the same time, a low voltage on node 3 turns off NMOS transistor device 210 and turns on PMOS transistor device 230. Nodes 1 and 6 are thereby electrically connected together through the PMOS transistor device 230. This results in Vcc being applied to the first terminal of capacitor 120. The end result of these connections is that the capacitors 110, 120 are wired together in parallel. Vcc is, thereby, applied across each capacitor 110, 120.

On the other hand, where Vcc is lower than Vref, the voltage comparator 140 of FIG. 1 operates such that node 2 goes low and node 3 goes high. As a result, NMOS transistor device 220 and PMOS transistor device 230 are turned off while NMOS transistor device 210 is turned on. Nodes 5 and 6 are, as a result, connected together, resulting in capacitors 110, 120 being wired in series with one another between Vcc and Vss.

Alternatively, in accordance with another aspect of the invention, switch element 130 may comprise MEMS devices. MEMS devices may integrate mechanical elements, sensors, actuators, electronics, etc., in a common silicon substrate through microfabrication technology. While the electronic components may be fabricated using, for example, a standard lithographic integrated circuit process (e.g., complementary MOS (CMOS), Bipolar, or BiCMOS processes), the micromechanical components may be fabricated using compatible micromachining processes that selectively etch away parts of the silicon wafer and/or add new structural layers to form mechanical and electromechanical devices. The operation and formation of MEMS devices is well described in readily-available publications, including, for example, *The MEMS Handbook*, edited by M. Gad-El-Hak, CRC Press, 2001, which is incorporated herein by reference.

MEMS devices for semiconductor applications have many advantages, including low insertion loss, low direct current (DC) power consumption, high linearity, and broad bandwidth performance. FIG. 2B shows a schematic diagram of an exemplary switch 130-b comprising cantilever-type MEMS devices for use in implementing the switch 130 depicted in FIG. 1, in accordance with a second illustrative embodiment of the invention. This switch 130-b comprises three cantilever MEMS devices 240, 250 and 260. Referring to MEMS device 240, when a high voltage is placed on a control terminal of the device at node 2 and a low voltage is placed on node 4, such as when comparator 140 detects that Vcc is greater than Vref, the cantilever membrane is repelled such that it swings into a position where it electrically connects nodes 4 and 5 together. Similarly, in MEMS device 260, the high voltage on a control terminal at node 2 causes nodes 1 and 6 to be connected together. In MEMS device 250, a low voltage on a control terminal at node 3 cause the cantilever membrane in the device to be positioned such that nodes 5 and 6 are electrically disconnected from one another (e.g., open circuit). As before, this configuration results in capacitors 110, 120 being wired in parallel. Alternatively, where voltage comparator 140 places a low voltage on node 2 and a high voltage on node 3, such as when the comparator 140 detects that Vcc is less than Vref, nodes 5 and 6 will be electrically connected together, while nodes 1 and 6, and nodes 4 and 5, will be open circuit. Capacitors 110, 120 are, thereby, wired in series with one another.

In accordance with yet another aspect of the invention, the switch 130 shown in FIG. 1 may comprise hinge-type MEMS devices. FIG. 2C is a schematic diagram illustrating an exemplary switch 130-c comprising hinge-type MEMS devices, in accordance with a third illustrative embodiment of the invention. Hinge-type MEMS devices are described, for example, in U.S. Pat. No. 6,143,997, which is incorporated herein by reference. Advantageously, hinge-type MEMS devices may overcome the need for high actuation voltages found in other types of MEMS switches. In switch 130-c, hinge plates 270, 280 are attracted toward either a first control terminal at node 2 or a second control terminal at node 3 by a high voltage applied to either node 2 or node 3, respectively. When node 2 is high and node 3 is low (e.g., when Vcc is less than Vref), hinge plates 270, 280 move toward node 2 and thereby electrically connect nodes 4 and 5 together, and nodes 1 and 6 together. Capacitors 110, 120 are connected together in parallel in this manner. When node 2 is low and node 3 is high (e.g., where Vcc is greater than Vref), hinge plates 270, 280 move toward node 3, thereby connecting nodes 5 and 6 together. This operation causes the capacitors 110, 120 to be connected in series.

Based on the preceding, it is clear that the level of the reference source voltage, Vref, is largely determinative of whether capacitors 110, 120 are wired in series or in parallel in the capacitor circuit embodiment of FIG. 1. In accordance with a preferred embodiment of the invention, Vref is selected to be approximately equal to a specified maximum sustainable voltage at which the capacitors 110, 120 can achieve a desired reliability lifetime. Such a maximum sustainable voltage is typically determined by stressing prototypes of integrated circuit capacitors prior to large scale production. Typically, one or more capacitors are exposed to a fixed electric field at a fixed temperature and a time-to-fail is measured. To meet certain lifetime requirements, a capacitor with a silicon dioxide thickness in a range of about 3–5 nanometers will typically have a maximum sustainable voltage of about 1.2 volts. As the dielectric layer becomes thicker, the maximum sustainable supply voltage will generally increase. However, the actual maximum sustainable voltage achievable by a given capacitor will likely depend on a combination of one or more characteristics of the capacitor and its dielectric. Beyond dielectric thickness and temperature, these characteristics may include, for example, dielectric impurity content, capacitor shape, method of dielectric growth, and others.

It will be recognized by those that skilled in the art that the circuit depicted in FIG. 1 would work in a manner consistent with that described above if a fraction of Vcc (e.g., Vcc/2) were applied to an input of the voltage comparator 140, as opposed to the full power supply voltage, and if Vref were reduced by the same ratio. The scope of this invention is intended to cover such a configuration. For example, a voltage equal to one half of the supply voltage Vcc could be input into the voltage comparator 140 at node 8. If Vref at node 9 were also reduced by one half, the illustrative capacitor circuit 100 of FIG. 1 would work identically to that where the full Vcc and Vref are applied to the voltage comparator 140. A voltage can be reduced by many methods including, but not limited to, implementation of a simple voltage divider circuit comprising two or more resistors (not shown). Such a voltage divider is described, for example, in *The Art of Electronics*, cited earlier.

Figure 3:
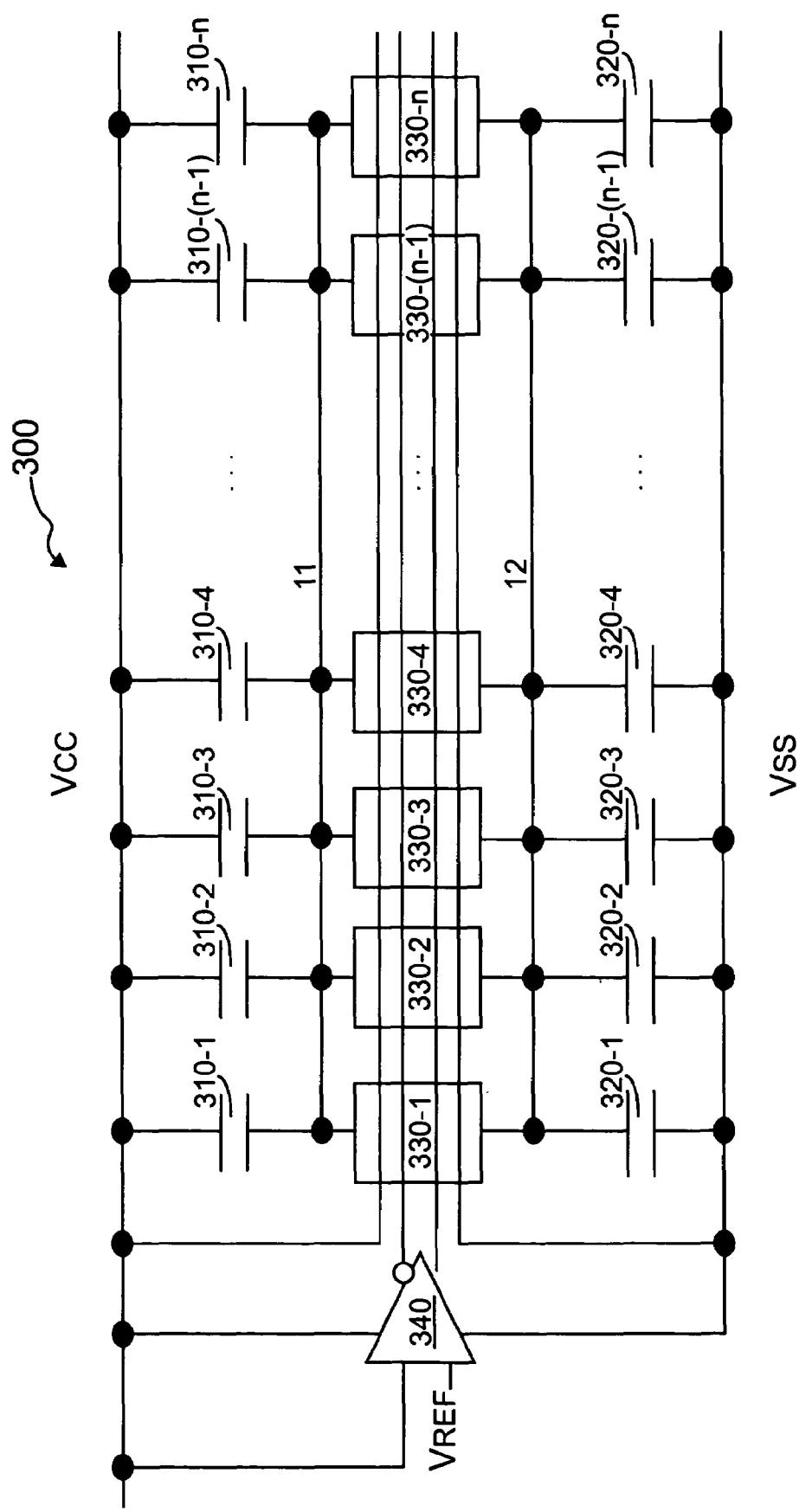
FIG. 3 is a schematic diagram illustrating an exemplary capacitor circuit comprising two groups of capacitors, formed in accordance with an embodiment of the invention.

The scope of the present invention is also not restricted to a capacitor circuit comprising only one pair of capacitors, as shown in FIG. 1. For example, FIG. 3 shows a schematic diagram of an exemplary capacitor circuit 300, formed in accordance with an alternative embodiment of the invention. The capacitor circuit 300 comprises n pairs of capacitors 310-1 and 320-1 through 310-n and 320-n, and n switches 330-1 through 330-n, where n is an integer greater than one. As apparent from the figure, a single voltage comparator 340 may be used to generate one or more control signals for selectively controlling a connection of the capacitors as a function of the supply voltage Vcc, in a manner similar to that described above in connection with FIG. 1.

An upper group of capacitors may be defined, comprising capacitors 310-1 through 310-n, referred to collectively as 310. Each of the capacitors 310 is preferably configured such that a first terminal is connected to Vcc and a second terminal is connected to node 11. Similarly, a lower group of capacitors may be defined, comprising capacitors 320-1 through 320-n, referred to collectively as 320. Each of the capacitors 320 is preferably configured such that a first terminal is connected to node 12 and a second terminal is connected to Vss. Switches 330-1 through 330-n are preferably connected between nodes 11 and 12. Each switch may be configured in a manner consistent with switch 130 depicted in FIG. 1. Like the single capacitor pair arrangement of FIG. 1, the operation of switches 330-1 through 330-n depends primarily on the outputs of the voltage comparator 340. When the supply voltage Vcc exceeds Vref, the two capacitor groups 310, 320 are connected together in series, otherwise the capacitor groups are connected together in parallel.

It should be noted with respect to the illustrative capacitor circuit 300 shown in FIG. 3 that, although a single switch could be used to implement the selective connection of the upper and lower capacitor groups, using a plurality of switches is preferable. Utilizing a plurality of switches ensures a more uniform and effective switching action, thereby enhancing circuit performance.

Figure 4:
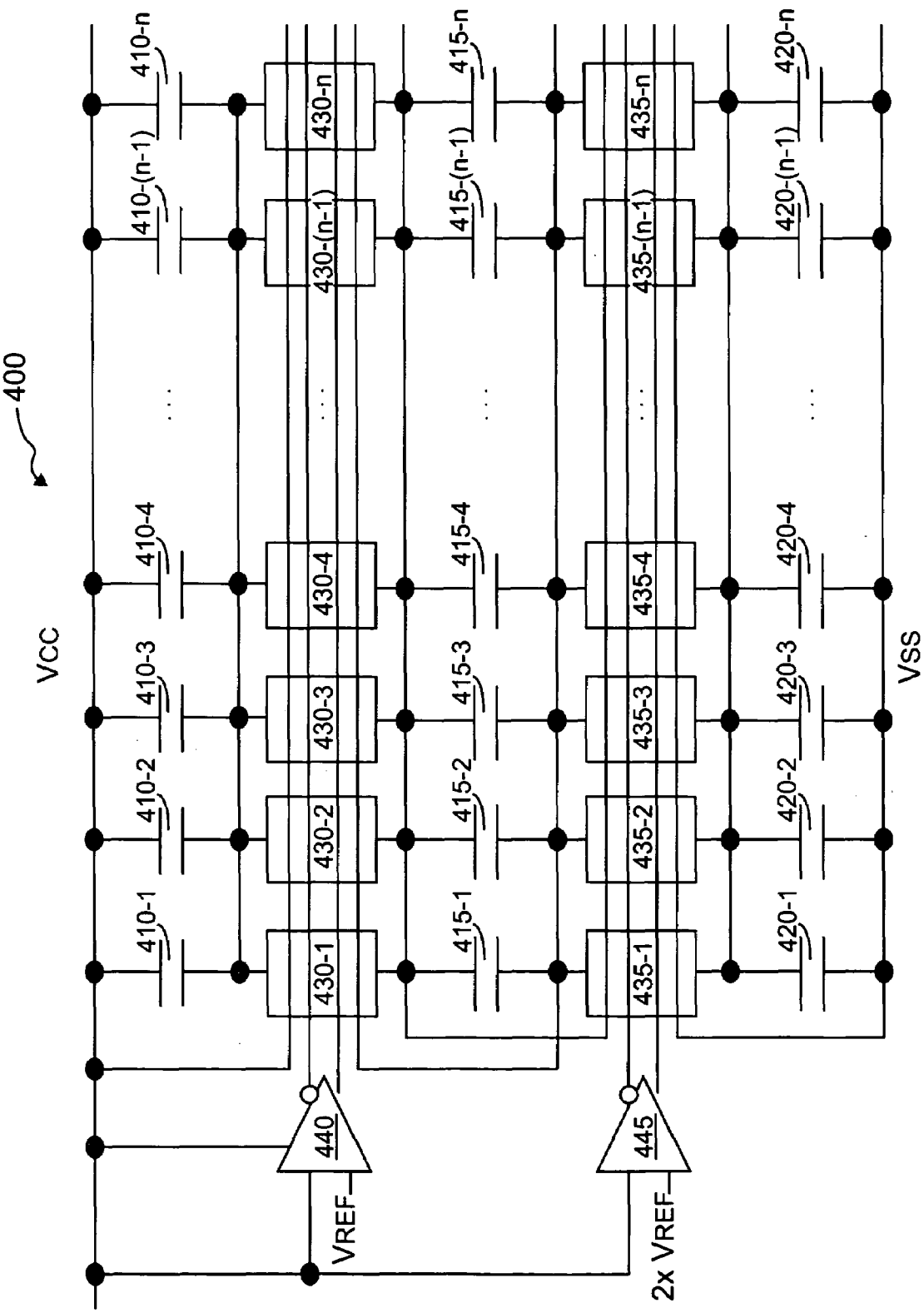
FIG. 4 is a schematic diagram illustrating an exemplary capacitor circuit comprising three groups of capacitors, formed in accordance with another embodiment of the invention.

If the supply level is expected to be higher than twice Vref, then three or more groups of capacitors may be necessary in order to effectively distribute the voltage across the capacitors so that capacitor reliability is not adversely affected. FIG. 4 shows a schematic diagram of an exemplary capacitor circuit 400 which may be employed when the supply voltage Vcc is too high to be distributed effectively across two capacitors (or two groups of capacitors), in accordance with another aspect of the invention. In this illustrative embodiment, three groups of capacitors are employed, namely, capacitors 410-1 through 410-n, referred to collectively as 410, capacitors 415-1 through 415-n, referred to collectively as 415, and capacitors 420-1 through 420-n, referred to collectively as 420, where n is an integer greater than one. The invention, however, is not limited to the particular circuit arrangement shown.

In the exemplary capacitor circuit 400, a first voltage comparator 440 is preferably used to compare Vcc and a first reference voltage, Vref. When Vcc exceeds Vref, switches 430-1 through 430-n are preferably operative to connect capacitors 410 in series with capacitors 415, in a manner consistent with that previously described in conjunction with FIG. 1. Simultaneously, a second voltage comparator 445 is preferably used to compare Vcc with a second reference voltage, which may be, for example, equal to twice Vref (2×Vref). When Vcc exceeds twice Vref, the third group of capacitors, 420 are added in series with capacitor groups 410 and 415. In this manner, the supply voltage Vcc is distributed across two groups of capacitors connected in series when Vref<Vcc<2×Vref, and Vcc is distributed across three groups of capacitors connected in series when Vcc>2×Vref. When Vcc is less than Vref, all of the capacitors are preferably connected in parallel, thereby maximizing the total capacitance for a given area.

It should be noted that certain components and/or devices may be formed using standard semiconductor processing techniques. For example, the capacitors employed in the present invention may comprise trench capacitors, diffusion capacitors, gate capacitors, metal-insulator-metal capacitors, etc. Semiconductor processing techniques required to form such capacitors, as well as other devices in the capacitor circuit, will be familiar to those skilled in the art. Such IC processing techniques frequently include, but are not limited to, one or more of the following: deposition, etching, silicon growth, photolithography, ion implantation, cleaning, and polishing. Each of these IC processing techniques are further described in a number of publications, including, for example, S. M. Sze, *VLSI Technology*, McGraw-Hill, 1988, which is incorporated herein by reference.

At least a portion of the capacitor circuit of the present invention may be implemented in an integrated circuit, although the techniques of the present invention are similarly applicable to a circuit comprised of discrete components. In forming integrated circuits, a plurality of identical die are typically fabricated in a repeated pattern on a surface of a semiconductor wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A capacitor circuit, comprising:
   at least first and second capacitors, a first terminal of the first capacitor connecting to a first source providing a first voltage, a first terminal of the second capacitor connecting to a second source providing a second voltage, the first voltage being greater than the second voltage;
   a voltage comparator including a first input for receiving a voltage representative of the first voltage, a second input for receiving a third voltage provided by a third source, and at least one output for generating at least one control signal, the at least one control signal being a function of a difference between the voltage representative of the first voltage and the third voltage; and
   a switch connected to second terminals of the first and second capacitors, the switch being selectively operable in one of at least a first mode and a second mode in response to the control signal, wherein in the first mode the switch is operative to connect the first and second capacitors together in parallel, and in the second mode the switch is operative to connect the first and second capacitors together in series, the first mode being indicative of the voltage representative of the first voltage being less than or about equal to the third voltage, and the second mode being indicative of the voltage representative of the first voltage being greater than the third voltage.

2. The circuit of claim 1, wherein the third voltage is substantially equal to a maximum sustainable voltage at which at least one of the first and second capacitors can achieve a specified reliability lifetime.

3. The circuit of claim 1, wherein the voltage comparator is operative to generate at least first and second control signals, the first and second control signals being independent functions of the difference between the voltage representative of the first voltage and the third voltage.

4. The circuit of claim 3, wherein the first and second control signals are logical complements of one another.

5. The circuit of claim 1, wherein the switch comprises at least one metal-oxide-semiconductor (MOS) transistor device.

6. The circuit of claim 1, wherein the switch comprises at least one microelectromechanical system (MEMS) device.

7. The circuit of claim 1, wherein the switch comprises at least one hinge-type microelectromechanical system (MEMS) device.

8. The circuit of claim 1, wherein the switch comprises at least one hinge-type microelectromechanical system (MEMS) device.

9. The circuit of claim 1, wherein the switch comprises first and second n-channel MOS (NMOS) devices and a p-channel MOS device, a drain of the first NMOS device being connected to the second terminal of the first capacitor, a gate of the first NMOS device receiving the control signal, a source of the first NMOS device being connected to the second terminal of the second capacitor, a drain of the second NMOS device being connected to the drain of the first NMOS device, a gate of the second NMOS device receiving a logical complement of the control signal, a source of the second NMOS device connecting to the second source, a drain of the PMOS device connecting to the first source, a gate of the PMOS being connected to the gate of the first NMOS device, and a source of the PMOS device being connected to the source of the first NMOS device.

10. The circuit of claim 1, wherein the switch comprises first, second and third cantilever-type MEMS devices, control terminals of the first and third MEMS devices receiving a logical complement of the control signal, a first terminal of the first MEMS device connecting to the second source, a second terminal of the first MEMS device being connected to the second terminal of the first capacitor, a first terminal of the second MEMS device being connected to the second terminal of the first MEMS device, a control terminal of the second MEMS device receiving the control signal, a second terminal of the second MEMS device being connected to the second terminal of the second capacitor, a first terminal of the third MEMS device being connected to the second terminal of the second MEMS device, and a second terminal of the third MEMS device connecting to the first source.

11. The circuit of claim 1, wherein the voltage comparator includes hysteresis.

12. The circuit of claim 1, wherein at least a given one of the at least first and second capacitors comprises at least one of a metal-oxide-semiconductor gate oxide capacitor, a trench capacitor, a diffusion capacitor, a discrete capacitor, and a metal-insulator-metal capacitor.

13. A capacitor circuit, comprising:
at least a first plurality of capacitors and a second plurality of capacitors, first terminals of the first plurality of capacitors connecting to a first source providing a first voltage, and first terminals of the second plurality of capacitors connecting to a second source providing a second voltage, the first voltage being greater than the second voltage;
a voltage comparator including a first input for receiving a voltage representative of the first voltage, a second input for receiving a third voltage provided by a third source, and at least one output for generating at least one control signal, the at least one control signal being a function of a difference between the voltage representative of the first voltage and the third voltage; and
at least one switch connected to second terminals of the first and second plurality of capacitors, the at least one switch being selectively operable in one of at least a first mode and a second mode in response to the control signal, wherein in the first mode the at least one switch is operative to connect the first and second plurality of capacitors together in parallel, and in the second mode the at least one switch is operative to connect the first and second plurality of capacitors together in series, the first mode being indicative of the voltage representative of the first voltage being less than or about equal to the third voltage, and the second mode being indicative of the voltage representative of the first voltage being greater than the third voltage.

14. The circuit of claim 13, wherein the third voltage is substantially equal to a maximum sustainable voltage at which at least one of the first and second plurality of capacitors can achieve a specified reliability lifetime.

15. The circuit of claim 13, wherein the voltage comparator is operative to generate at least first and second control signals, the first and second control signals being independent functions of the difference between the voltage representative of the first voltage and the third voltage.

16. The circuit of claim 15, wherein the first and second control signals are logical complements of one another.

17. The circuit of claim 13, further comprising a plurality of switches, each of the switches being connected to a corresponding pair of capacitors, the pair of capacitors including a capacitor from the first plurality of capacitors and a capacitor from the second plurality of capacitors, each of the switches being selectively operable in one of at least the first mode and the second mode in response to the control signal, wherein in the first mode the switch is operative to connect the corresponding pair of capacitors together in parallel, and in the second mode the switch is operative to connect the corresponding pair of capacitors together in series.

18. The circuit of claim 13, wherein the at least one switch comprises at least one metal-oxide-semiconductor (MOS) transistor device.

19. The circuit of claim 13, wherein the at least one switch comprises at least one microelectromechanical system (MEMS) device.

20. An integrated circuit including at least one capacitor circuit, the at least one capacitor circuit comprising:
at least first and second capacitors, a first terminal of the first capacitor connecting to a first source providing a first voltage, a first terminal of the second capacitor connecting to a second source providing a second voltage, the first voltage being greater than the second voltage;
a voltage comparator including a first input for receiving a voltage representative of the first voltage, a second input for receiving a third voltage provided by a third source, and at least one output for generating at least one control signal, the at least one control signal being a function of a difference between the voltage representative of the first voltage and the third voltage; and
a switch connected to second terminals of the first and second capacitors, the switch being selectively operable in one of at least a first mode and a second mode in response to the control signal, wherein in the first mode the switch is operative to connect the first and second capacitors together in parallel, and in the second mode the switch is operative to connect the first and second capacitors together in series, the first mode being indicative of the voltage representative of the first voltage being less than or about equal to the third voltage, and the second mode being indicative of the voltage representative of the first voltage being greater than the third voltage.

21. The integrated circuit of claim 20, wherein at least one of the first and second capacitors is at least partially formed in a trench in a semiconductor substrate of the integrated circuit.

* * * * *

UNITED STATES PATENT AND TRADEMARK OFFICE
CERTIFICATE OF CORRECTION

PATENT NO. : 7,113,006 B2 Page 1 of 1
APPLICATION NO. : 11/065840
DATED : September 26, 2006
INVENTOR(S) : L.L. Hsu et al.

It is certified that error appears in the above-identified patent and that said Letters Patent is hereby corrected as shown below:

In the claims:

Claim 7, col. 8, line 61, delete "hinge-type" and insert --cantilever-type--.

Signed and Sealed this

Second Day of January, 2007

JON W. DUDAS
*Director of the United States Patent and Trademark Office*